(No Model.)
J. S. COOK.
SAW MANDREL.
No. 261,680. Patented July 25, 1882.
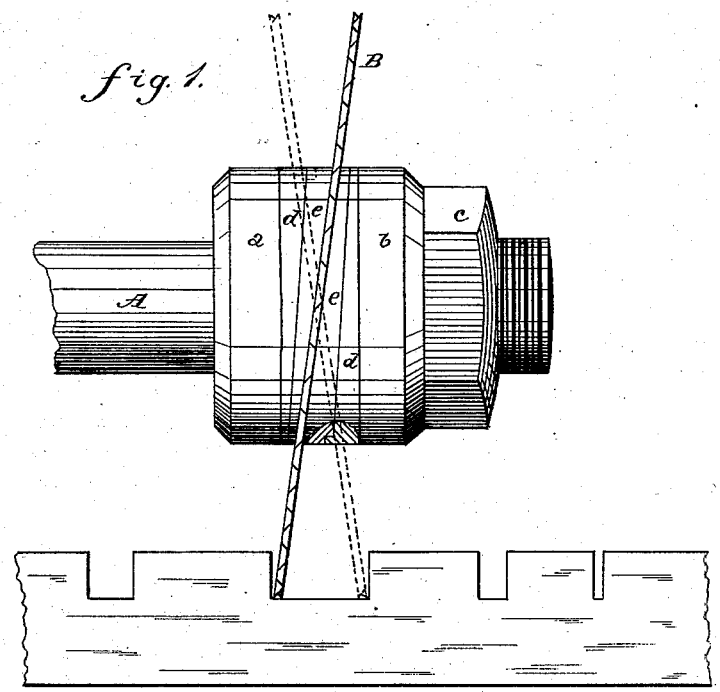
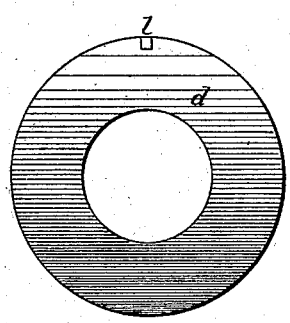
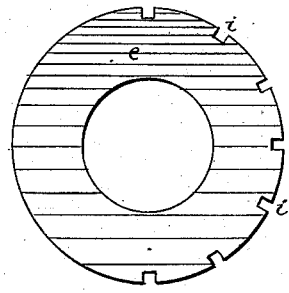
WITNESSES:
INVENTOR:
J. S. Cook
BY Munn & Co
ATTORNEYS.

UNITED STATES PATENT OFFICE.

JOSEPH S. COOK, OF WHITINSVILLE, MASSACHUSETTS.

SAW-MANDREL.

SPECIFICATION forming part of Letters Patent No. 261,680, dated July 25, 1882.

Application filed May 3, 1882. (No model.)

*To all whom it may concern:*

Be it known that I, JOSEPH S. COOK, of Whitinsville, in the county of Worcester and State of Massachusetts, have invented a new and useful Improvement in Saw-Mandrels, of which the following is a full, clear, and exact description.

My improvements relate to saw-mandrels fitted for holding saws at an inclination for the purpose of cutting grooves, the width of the groove being regulated by the degree of inclination and diameter of the saw. Usually the saws have been fastened in this manner by the use of two washers of beveled form, the thin edge of one washer being placed opposite the thick edge of the other; but this plan necessitates the use of a different set of washers for every width of groove that is to be cut.

With my improved mandrel I use four washers or collars to allow adjustment of the saw at any angle required, and provide notches and pins or equivalent devices for the purpose of securing uniformity and accuracy in the setting of the saws, as hereinafter described and claimed.

Reference is to be had to the accompanying drawings, forming part of this specification, in which similar letters of reference indicate corresponding parts in all the figures.

Figure 1 is a side elevation of my improved saw-mandrel. Figs. 2 and 3 are face views of the washers which I employ.

A is the mandrel, provided with fixed collar $a$ and movable collar $b$, between which the saw and beveled washers are clamped by the nut $c$.

$d\,d$ and $e\,e$ are the beveled collars or washers that hold the saw B at the inclination required. These collars correspond nearly in form and thickness, and are placed two at each side of the saw. As shown, the two washers at one side of the saw are placed with their thicker portions together and at one side of the mandrel, while the other two washers are placed with their thicker portions at the opposite side of the mandrel, thereby giving to the saw the greatest possible inclination, so that it shall cut a groove of more or less width, according to the diameter of the saw.

To vary the inclination of the saw each washer $d$ is to be turned upon its mate $e$, so as to lessen the width of the widest portion, which may be continued until the outer surface of the two washers $d\,e$ are parallel, when the saw would be held at right angles to the mandrel.

To prevent the washers from turning one on the other, and to facilitate their adjustment so as to secure accuracy, each washer $e$ is provided with notches $i$, and each washer $d$ with pins or lugs $l$ for entering the notches $i$. These notches and pins, being placed at regular intervals, become guides for adjustment of the saw, and they may be numbered to facilitate the operation.

Having thus fully described my invention, I claim as new and desire to secure by Letters Patent—

The combination, with the saw and mandrel, of the washers $d$ and $e$, one of which is provided with a series of peripheral notches, $i$, and the other with lug $l$, adapted to enter either of said notches $i$ for locking the two washers together and insuring the saw being properly held.

JOSEPH SULLIVAN COOK.

Witnesses:
EDWARD WHITIN,
ARTHUR F. WHITIN.